United States Patent
Potocki et al.

(10) Patent No.: US 11,028,865 B2
(45) Date of Patent: Jun. 8, 2021

(54) METHOD OF ATTACHING SHEETS TOGETHER

(71) Applicants: MAGNA INTERNATIONAL INC., Aurora (CA); John Richard Potocki, Armada, MI (US); William Andrew Kokosza, Windsor (CA); Steven Reece Falter, Lake Orion, MI (US)

(72) Inventors: John Richard Potocki, Armada, MI (US); William Andrew Kokosza, Windsor (CA); Steven Reece Falter, Lake Orion, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 52 days.

(21) Appl. No.: 16/345,534

(22) PCT Filed: Dec. 4, 2017

(86) PCT No.: PCT/US2017/064467
§ 371 (c)(1),
(2) Date: Apr. 26, 2019

(87) PCT Pub. No.: WO2018/102804
PCT Pub. Date: Jun. 7, 2018

(65) Prior Publication Data
US 2019/0309775 A1 Oct. 10, 2019

Related U.S. Application Data

(60) Provisional application No. 62/429,351, filed on Dec. 2, 2016.

(51) Int. Cl.
*B21J 15/08* (2006.01)
*B21J 15/10* (2006.01)
(Continued)

(52) U.S. Cl.
CPC .............. *F16B 5/04* (2013.01); *B21J 15/02* (2013.01); *B21J 15/08* (2013.01); *B21J 15/10* (2013.01);
(Continued)

(58) Field of Classification Search
CPC . B21J 15/02; B21J 15/025; B21J 15/08; B21J 15/147; B21J 15/10; B21J 15/36; Y10T 29/49956; Y10T 29/49943
See application file for complete search history.

(56) References Cited

U.S. PATENT DOCUMENTS

| 3,634,928 A | 1/1972 | Falcioni |
| 3,828,421 A | 8/1974 | Erlichman |

(Continued)

FOREIGN PATENT DOCUMENTS

| DE | 4339249 A1 | 5/1995 |
| DE | 102011118816 A1 | 5/2012 |
| WO | 2006044829 A2 | 4/2006 |

OTHER PUBLICATIONS

Extended European Search Report, EP Application No. 17876017.9, dated Jul. 1, 2020.

*Primary Examiner* — Jermie E Cozart
(74) *Attorney, Agent, or Firm* — Dickinson Wright PLLC

(57) ABSTRACT

The method includes the step of positioning the sheets in an at least partially overlapping relationship. The method continues with the step of inserting a rivet that has a height through an overlapping area of the sheets. The method proceeds with the step of, with the rivet at a temperature in the range of 15-30° Celsius, collapsing the rivet between a pair of ramming surfaces to shorten the rivet and partially expand the rivet outwardly to lock the rivet with the sheets. The entire method results in a very strong connection between the sheets and with a great durability at a low cost.

9 Claims, 4 Drawing Sheets

(51) Int. Cl.
    *B21J 15/02*         (2006.01)
    *B21J 15/14*         (2006.01)
    *B21J 15/36*         (2006.01)
    *F16B 5/04*          (2006.01)
    *F16B 19/06*        (2006.01)
    *F16B 11/00*        (2006.01)

(52) U.S. Cl.
    CPC ............ *B21J 15/147* (2013.01); *B21J 15/36* (2013.01); *F16B 19/06* (2013.01); *B21J 15/025* (2013.01); *F16B 11/006* (2013.01)

(56) References Cited

U.S. PATENT DOCUMENTS

| | | | | |
|---|---|---|---|---|
| 4,048,708 | A | * | 9/1977 | Briles ............... B21J 15/02 29/509 |
| 4,060,189 | A | * | 11/1977 | Vargo, Jr. ............ B21J 15/10 227/53 |
| 4,192,058 | A | | 3/1980 | Falcioni |
| 5,060,362 | A | | 10/1991 | Birke et al. |
| 5,680,690 | A | | 10/1997 | Briles |
| 2002/0125297 | A1 | * | 9/2002 | Stol ............... B23K 20/1295 228/112.1 |
| 2003/0167620 | A1 | | 9/2003 | Wang et al. |
| 2011/0189480 | A1 | * | 8/2011 | Hung ............... C22F 1/06 428/379 |

\* cited by examiner

METHOD OF ATTACHING SHEETS TOGETHER

CROSS REFERENCE TO RELATED APPLICATIONS

This U.S. National Stage Patent Application claims the benefit of PCT International Patent Application Serial No. PCT/US2017/064467 filed Dec. 4, 2017 entitled "Method Of Attaching Sheets Together" which claims the benefit of U.S. Provisional Patent Application Ser. No. 62/429,351 filed Dec. 2, 2016 entitled "Method Of Riveting Magnesium Sheets Or Castings," the entire disclosures of the applications being considered part of the disclosure of this application and hereby incorporated by reference.

BACKGROUND OF THE INVENTION

1. Field of the Invention

The present invention is related generally to a process of attaching sheets of metal together with rivets.

2. Related Art

Generally, when riveting two or more sheets together, the rivets used are made of the same metal as the sheets to prevent corrosion issues from occurring where different metals interface. Therefore, when using rivets that are made of a different metal than one or both of the sheets, the rivets are typically coated. However, oftentimes, the riveting operation scrapes off some of the coating, thus leaving the interface between the dissimilar metals susceptible to corrosion.

Also, when using magnesium rivets, the magnesium can sometimes crack at or around a button area during the riveting process. To guard against this, the magnesium rivet is sometimes pre-heated before the riveting operation. However, this adds time and equipment to the riveting operation, thereby increasing the cost of the procedure and still may not protect against corrosion issues if one or both of the sheets being joined is not made of magnesium.

There remains a continuing need for an improved riveting operation which overcomes one or more of the problems of the prior art.

SUMMARY OF THE INVENTION AND ADVANTAGES

One aspect of the present invention is related to a method of attaching two or more metal sheets together. The method includes the step of positioning the sheets in an at least partially overlapping relationship. The method continues with the step of inserting a rivet that has a height through an overlapping area of the sheets. The method proceeds with the step of, with the rivet at a temperature in the range of 15–30° Celsius, collapsing the rivet between a pair of ramming surfaces to shorten the rivet and partially expand the rivet outwardly to lock the rivet with the sheets. The entire method results in a very strong connection between the sheets and with a great durability at a low cost.

According to another aspect of the present invention, at least one of the sheets is made of a different metal than at least one of the other sheets.

According to yet another aspect of the present invention, the rivet is made of a different metal than at least one of the sheets.

According to still another aspect of the present invention, the rivet is made of magnesium or a magnesium alloy.

According to a further aspect of the present invention, at least one of the sheets is made of aluminum, an aluminum alloy, steel or a steel alloy.

According to yet a further aspect of the present invention, the method further includes the step of piercing or drilling a hole through the overlapping area of the sheets and wherein the step of inserting the rivet through the overlapping area of the sheets is further defined as inserting the rivet into the hold.

According to still a further aspect of the present invention, before the step of inserting the rivet into the hole, the rivet has no head or tail. Thus, the rivet can be made at a very low cost.

According to another aspect of the present invention, before the step of collapsing the rivet, the rivet projects out of the hole on opposite sides of the sheets.

According to yet another aspect of the present invention, each of the ramming surfaces has a spike projecting outwardly therefrom such that the step of collapsing the rivet causes metal of the rivet to plastically deform outwardly whereby a pair of flanges are created in the rivet.

According to still another aspect of the present invention, the step of inserting the rivet through the sheets is further defined as piercing the rivet through the overlapping area of the sheets.

Another aspect of the present invention is related to a component with at least two metal sheets that are in an at least partially overlapping relationship. At least one rivet extends through an overlapping area of the sheets, and the rivet has a pair of flanges on opposite sides of the sheets to lock the sheets together. The at least one rivet is made out of metal, and the metal of at least one of the flanges is cold worked.

According to another aspect of the present invention, at least one of the sheets is made of a different metal than the at least one rivet.

According to yet another aspect of the present invention, the rivet is made of magnesium or a magnesium alloy.

According to still another aspect of the present invention, a coating is interposed between the rivet and the sheets such that there is no metal-to-metal contact between the rivet and the sheets.

According to yet a further aspect of the present invention, the at least one rivet has a pair of end faces, and each end face has a dimple.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Referring to the Figures, wherein like numerals indicate corresponding parts throughout the several views, one aspect of the present invention is related to a method of attaching a pair of metal structures, such as sheets, plates or castings, at room temperature. For simplicity, the structures are referred to hereinafter as "sheets". The sheets 20, 22 can be made of any combination of steel, aluminum, magnesium or alloys thereof. Although the Figures illustrate only two sheets 20, 22 being attached together, it should be appreciated that the method could also be used to join three (or more) sheets. The sheets 20, 22 can have similar or different thicknesses and may be arranged in any suitable overlapping manner. For example, the sheets 20, 22 may only partially overlap one another or one of the sheets 20, 22 may fully overlie or underlie the other sheet 20, 22. The sheets may be of any combination of metals including steels, alloy steels, magnesium, magnesium alloys, aluminum or aluminum alloys and could be for any suitable purpose. The exemplary method is discussed in further detail below and is illustrated, sequentially, in FIGS. 1-7.

Figure 1:
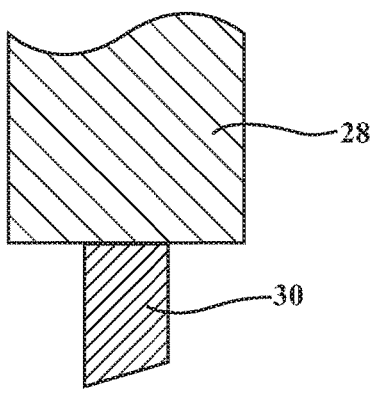
FIG. 1 is a cross-sectional view of a pair of sheets to be joined positioned in a punching tool before a punching operation.
Figure 2:
FIG. 2 is a cross-sectional view showing the punching operation.
Figure 2:
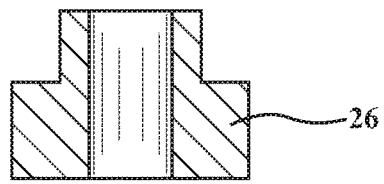
Figure 2:
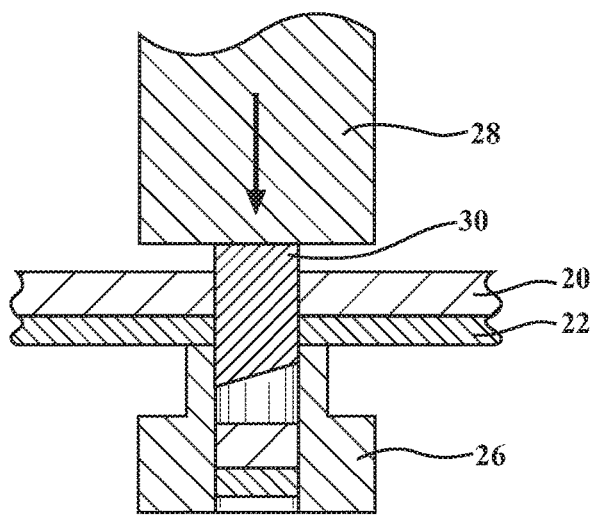
Figure 3:
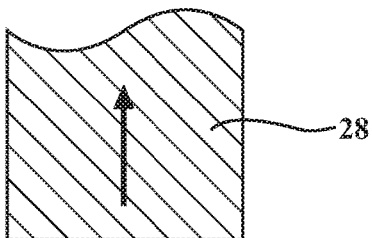
FIG. 3 is a cross-sectional view after the punching operation.
Figure 3:
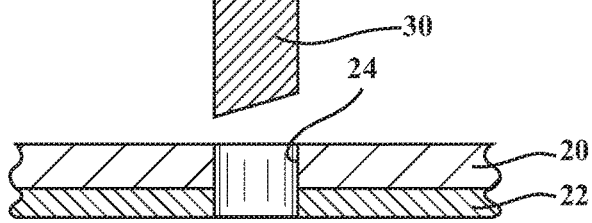
Figure 3:
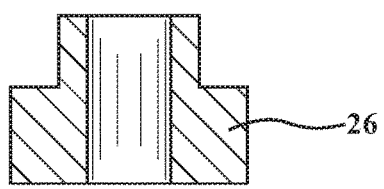
Figure 3:

Referring to FIG. 1, the exemplary method begins by placing the sheets 20, 22 in overlapping surface-to-surface contact with one another and piercing or drilling a hole 24 through the sheets 20, 22. In the Figures, a piercing operation is illustrated. A die plate 26 is positioned on one side of the overlapping sheets 20, 22, and a punch plate 28 with a punch 30 is positioned on an opposite side. The die plate 26 has an opening, and the punch 30 is shaped similarly to the opening such that when the die and punch plates 26, 28 are brought together, the punch 30 can extend into the opening of the die plate 26. Referring now to FIGS. 2 and 3, the method continues with activating an actuator (not shown) to urge the punch plate 28 and the punch 30 towards the die plate 26 such that the punch 30 pierces through the sheets 20, 22 to produce the hole 24 such that the hole 24 extends through the overlapping sheets 20, 22. The punch plate 28 and the punch 30 are then retracted away from the sheets 20, 22, and a scrap slug (not shown) from the piercing operation is removed from the die plate 26 and recycled or discarded. The punch 28 and opening may have any suitable shapes (e.g., circular, square, triangular, etc.) to produce any suitably shaped hole 24 in the sheets 20, 22.

Figure 7:
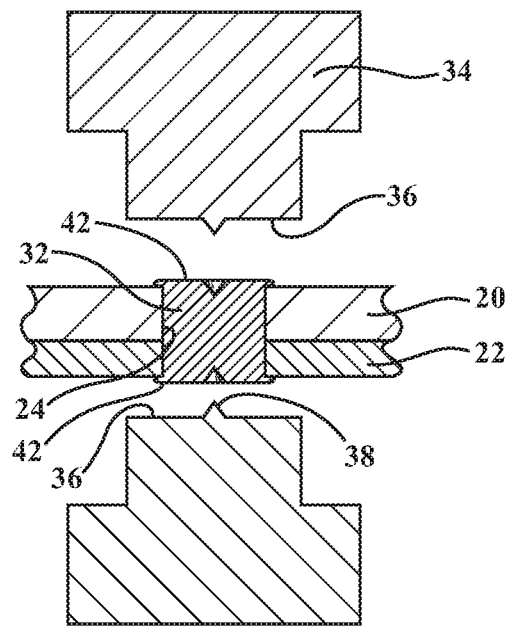
FIG. 7 is a cross-sectional view of the sheets after the peening operation.
Figure 8:
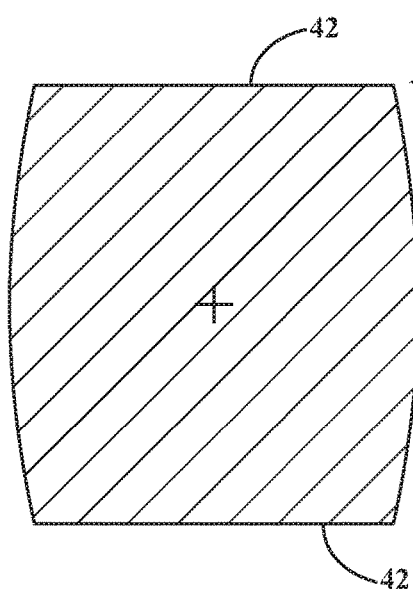
FIG. 8 is a cross-sectional view of a rivet before the peening operation.

The method proceeds with loading a rivet 32, which is at room temperature (approximately 15-30° Celsius), into a peening device 34 which includes two ramming surfaces 36. As shown in FIG. 7, the ramming surfaces 36 are generally planar with the exception of a single, generally conically shaped spike 38 that projects from each ramming surface 36. Referring now to FIG. 8, the undeformed rivet 32 is generally cylindrical in shape with a side wall 40 and a pair of opposite end faces 42, which are both generally planar. The rivet 32 is solid throughout (i.e., not hollow) and, in contrast to many other known rivets, does not have a head or a tail. In this embodiment, the side wall 40 bows outwardly in approximately an axial midpoint of the rivet 32. Thus, the rivet 32 has a greater diameter in its central area than at either of its end faces 42. However, the maximum diameter of the rivet 32 is less than the diameters of the ramming surfaces 36. The rivet 32 is preferably made of magnesium or a magnesium alloy.

Figure 4:
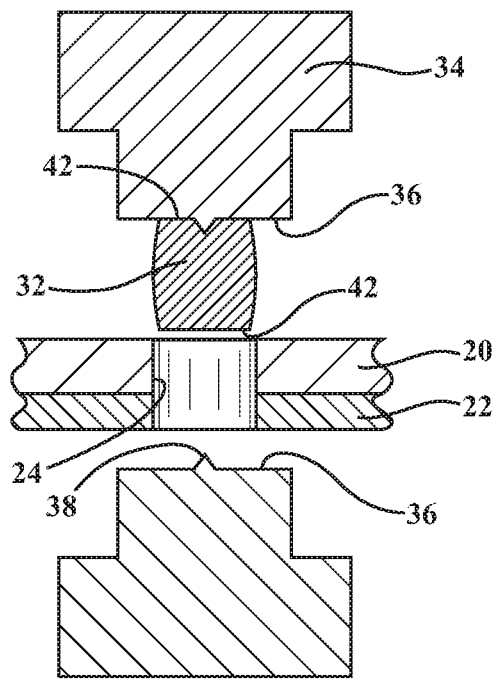
FIG. 4 is a cross-sectional view of the sheets after punching in a peening device before a peening operation.
Figure 5:
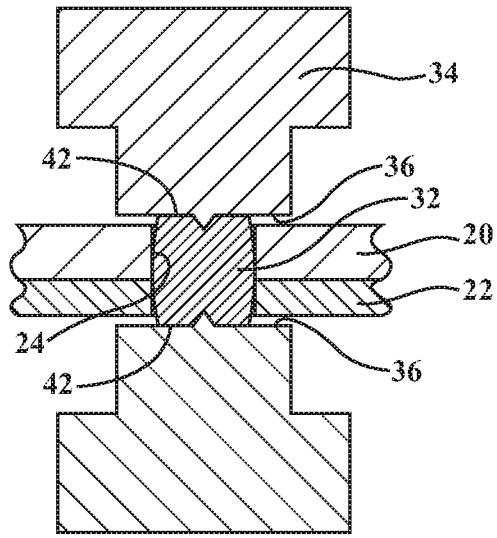
FIG. 5 is a cross-sectional view showing the peening operation.

As shown in FIG. 4, the method proceeds with aligning the rivet 32 with the hole 24 in the overlapping sheets 20, 22. As shown in FIG. 5, the peening device 32 is then activated to press the rivet 32 into the hole 24 with one of the ramming surfaces 36. The rivet 32 has a length which is greater than the combined thicknesses of the two sheets 20, 22 and is pressed into the hole 24 until it projects out of the hole 24 on both sides of the sheets 20, 22.

Figure 6:
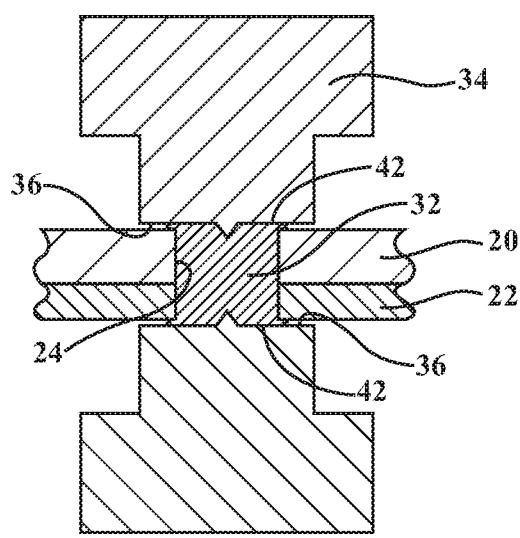
FIG. 6 is another cross-sectional view showing the peening operation.

Next, as shown in FIG. 6, without heating the rivet 32, the ramming surfaces 36 are further forced towards one another to collapse (i.e., plastically deform) the rivet 32 such that it expands radially to completely fill the hole 24 and establish a strong connection with the sheets 20, 22. The spikes 38 on the ramming surfaces 36 force the material adjacent the end faces 42 of the rivet 32 radially outwardly to form flanges 44 (or lips) which overly the outer surfaces of the sheets 20, 22. Specifically, because of the greater size and generally planar nature of the ramming surfaces 36, the material of the rivet 32 has nowhere to go but outwardly, thereby creating the flange 44. Thus, the flanges 44 are formed into the rivet 32 through cold working. As shown in FIG. 7, the ramming surfaces 36 are then retracted from one another, and the rivet 32 has a shorter length than it did before the collapsing process. The peening device 34 is preferably powered by a servo motor (not shown), but any suitable actuator may be used. The sheets 20, 22 are sandwiched between the flanges 44 of the rivet 32 such that the rivet 32 forms a, for all intents and purposes, permanent connection between the sheets 20, 22. This entire operation produces a very strong connection between the sheets 20, 22 and may be accomplished very quickly and at low cost as compared to other known riveting operations which often involve heating the rivet.

Figure 9:
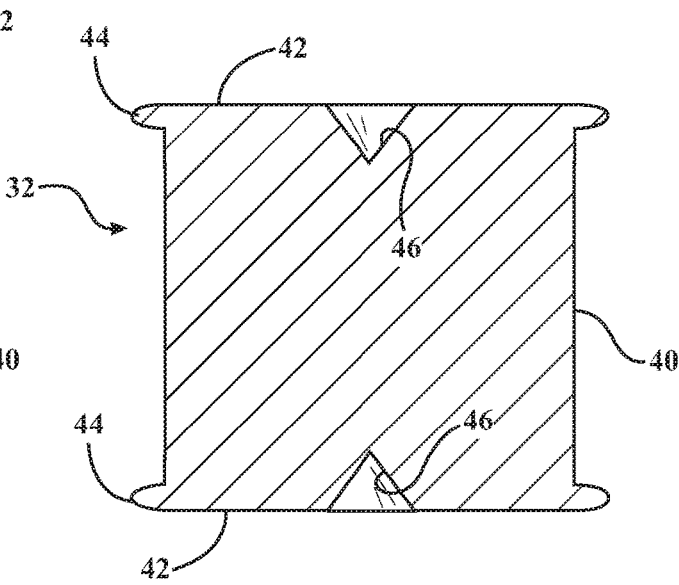
FIG. 9 is a cross-sectional view of the rivet of FIG. 8 after the peening operation.
Figure 10:
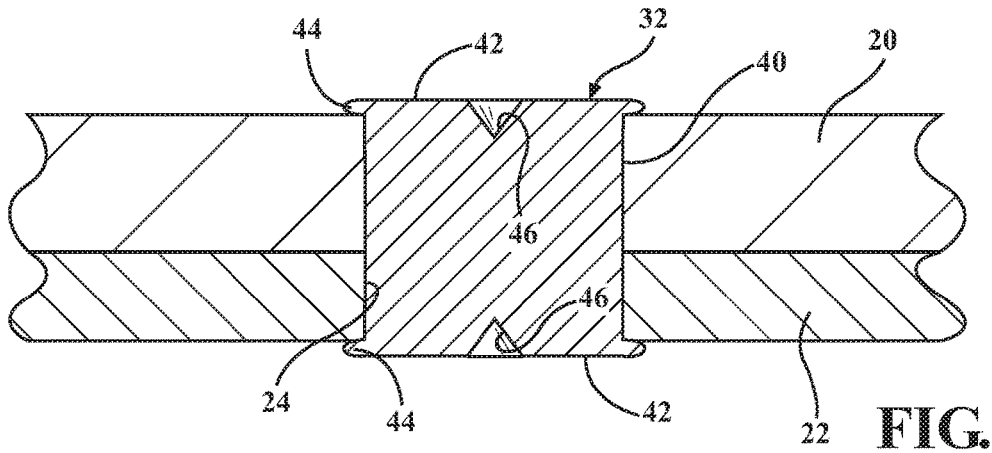
FIG. 10 is a cross-sectional view of a component after the peening operation.

FIG. 9 shows the rivet 32 after the method is completed. As shown, the collapsed rivet 32 has a pair of conical dimples 46 on its end faces 42 from spikes 38 on the ramming surfaces 36. The dimples 46 are centrally located on the end faces 42. As also shown in FIG. 9, the flanges 44 on the rivet 32 are aligned axially with the dimples 46. The flanges 44 engage the outer surfaces of the sheets 20, 22 to significantly improved the tensile force required to peel the sheets 20, 22 away from one another and also establish hermetic seals between the rivet 32 and the sheets 20, 22, thereby preventing corrosion of either the rivet 32 or the sheets 20, 22.

Figure 11:
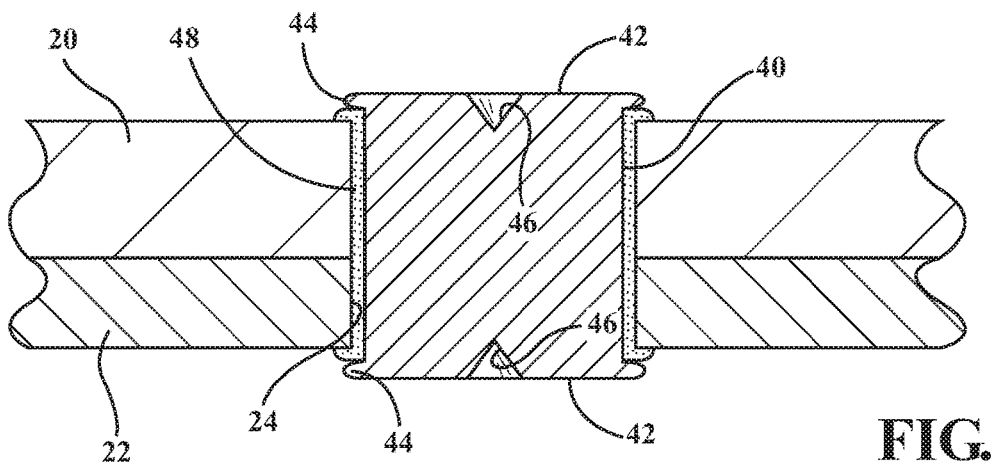
FIG. 11 is an alternate embodiment of the component after the peening operation.
Figure 12:
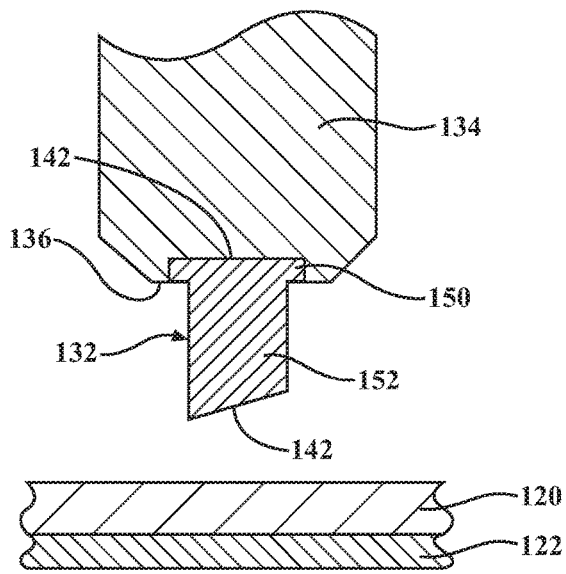
FIG. 12 is a cross-sectional view of a pair of sheets prior to a peening operation according to an alternate aspect of the invention.
Figure 13:
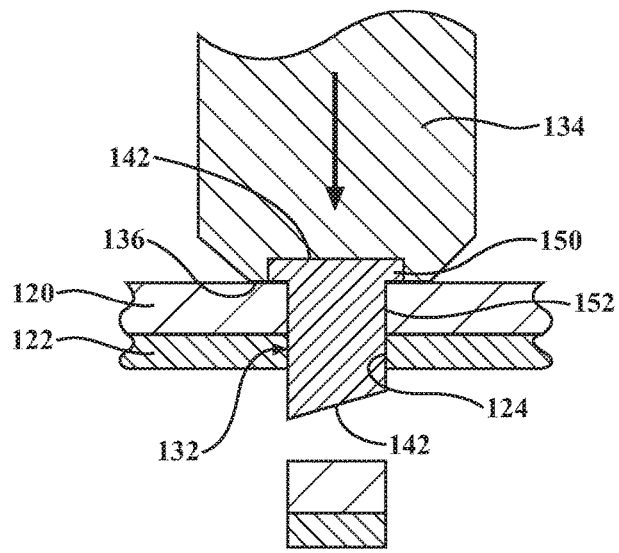
FIG. 13 is a cross-sectional view showing the peening operation of the alternate aspect of the invention.
Figure 14:
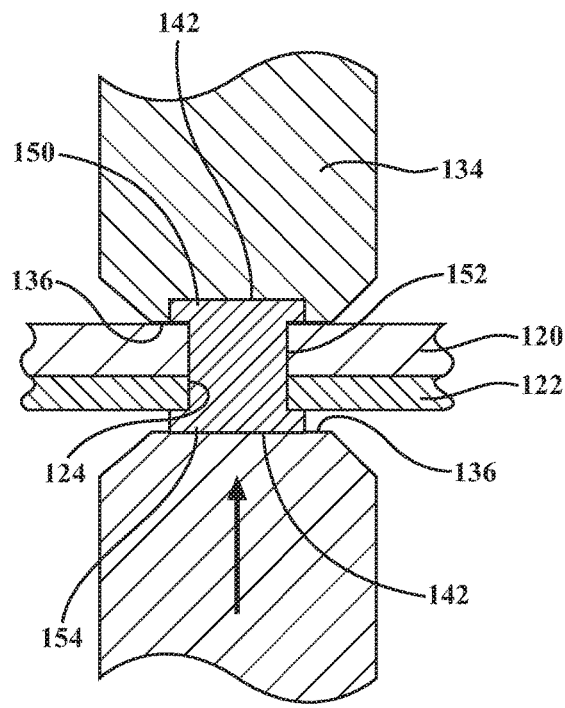
FIG. 14 is another cross-sectional view showing the peening operation of the alternate aspect of the invention.
Figure 15:
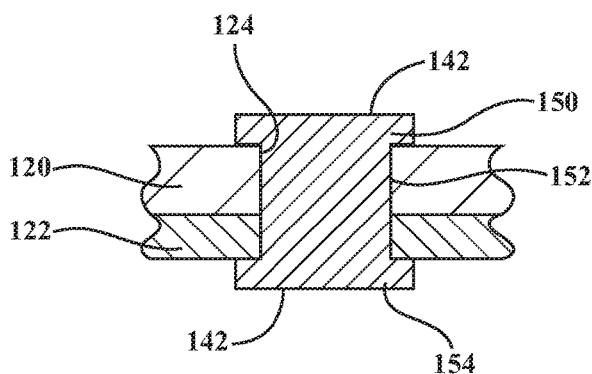
FIG. 15 is a cross-sectional view showing the component after the peening operation of the alternate aspect of the invention.

The rivet 32 may alternately be made of steel, aluminum, magnesium or alloys thereof. In any combination of materials other than only magnesium sheets and a magnesium rivet, the method preferably further includes the step of coating the hole 24 and/or the side wall 40 of the rivet 32 prior to pressing the rivet 32 into the hole 24 to prevent the part made of magnesium from reacting with the part or parts that aren't made of magnesium. The above-described method is advantageous as compared to other riveting methods because the coating does not get scraped off of or otherwise removed from the rivet 32 or hole 24 during the collapsing process. The coating 48 preferably has sufficient elasticity to prevent cracking and could be a sealer or could be an adhesive-type coating to further strengthen the bonds between the rivet 32 and the sheets 20, 22. FIG. 11 shows an embodiment wherein the hole 24 and/or the rivet 32 is coated.

With like numerals, separated by a prefix of "1" indicating corresponding parts with the above-described method, FIGS. 12-15 sequentially illustrate a process for attaching two or more sheets 120, 122 together according to an alternate aspect of the present invention. In an uncollapsed state, the rivet 132 of this aspect has a head 150 and a shank 152 which is solid (i.e., not hollow) along its length. The method includes positioning the sheets 120, 122 such that they at least partially overly one another. Next, the rivet 132 is loaded into one of the ramming surfaces 136. The ramming surface 136 is then urged towards the sheets 120, 122 to directly pierce the sheets 120, 122 with the shank 152 of the rivet 132. Once the shank 152 protrudes through the sheets 120, 122, the opposite end of the shank 152 is peened, or deformed, such that it has a tail 154 to lock the sheets 120, 122 together. Where one of the sheets 120, 122 or the rivet 132 is of magnesium and another of the sheets 120, 122 or the rivet 132 is made of a non-magnesium material, then a coating is preferably applied to the rivet 132 prior to piercing.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A method of attaching two or more metal sheets together, comprising the steps of:
   positioning the sheets in an at least partially overlapping relationship;
   piercing or drilling a hole through an overlapping area of the sheets;
   inserting a rivet that has a height into the hole in the overlapping area of the sheets, the rivet having a pair of end faces and a diameter at an axial midpoint that is greater than at either of the end faces and the diameter at the axial midpoint being similar to a diameter of the hole;
   with the rivet at a temperature in the range of 15-30° Celsius, collapsing the rivet between a pair of ramming surfaces to shorten the rivet and partially expand the rivet outwardly to lock the rivet with the sheets, each of the ramming surfaces having a spike surrounded by a fully planar area.

2. The method as set forth in claim 1 wherein at least one of the sheets is made of a different metal than at least one of the other sheets.

3. The method as set forth in claim 1 wherein the rivet is made of a different metal than at least one of the sheets.

4. The method as set forth in claim 3 wherein the rivet is made of magnesium or a magnesium alloy.

5. The method as set forth in claim 4 wherein at least one of the sheets is made of aluminum, an aluminum alloy, steel or a steel alloy.

6. The method as set forth in claim 1 wherein before the step of inserting the rivet into the hole, the rivet has no head or tail.

7. The method as set forth in claim 6 wherein before the step of collapsing the rivet, the rivet projects out of the hole on opposite sides of the sheets.

8. The method as set forth in claim 7 wherein each of the ramming surfaces having said spike projecting outwardly therefrom such that the step of collapsing the rivet causes metal of the rivet to plastically deform outwardly whereby a pair of flanges are created in the rivet.

9. The method as set forth in claim 1 wherein the rivet is solid throughout.

* * * * *